(12) United States Patent
Fuhrer

(10) Patent No.: US 12,368,250 B2
(45) Date of Patent: Jul. 22, 2025

(54) HOLDING DEVICE FOR A CABLE

(71) Applicant: AGRO AG, Hunzenschwil (CH)

(72) Inventor: Stefan Fuhrer, Sarmenstorf (CH)

(73) Assignee: AGRO AG, Hunzenschwil (CH)

( * ) Notice: Subject to any disclaimer, the term of this patent is extended or adjusted under 35 U.S.C. 154(b) by 343 days.

(21) Appl. No.: 17/800,458

(22) PCT Filed: Feb. 19, 2021

(86) PCT No.: PCT/EP2021/054134
§ 371 (c)(1),
(2) Date: Aug. 17, 2022

(87) PCT Pub. No.: WO2021/165461
PCT Pub. Date: Aug. 26, 2021

(65) Prior Publication Data
US 2023/0091916 A1    Mar. 23, 2023

(30) Foreign Application Priority Data
Feb. 20, 2020    (CH) .................. 00195/20

(51) Int. Cl.
*H01R 9/05*    (2006.01)
*H01R 4/50*    (2006.01)
(Continued)

(52) U.S. Cl.
CPC ......... *H01R 9/0518* (2013.01); *H01R 4/5025* (2013.01); *H01R 9/0521* (2013.01);
(Continued)

(58) Field of Classification Search
CPC .......... H01R 13/5808; H01R 13/65912; H01R 4/5025; H01R 9/0518; H01R 9/0521; H02G 3/0658; H02G 3/0666; H02G 3/0675
(Continued)

(56) References Cited

U.S. PATENT DOCUMENTS 4,739,126 A * 4/1988 Gutter .................... H02G 3/065
439/98
5,998,736 A * 12/1999 Rumsey ................. H01R 13/53
174/84 R
(Continued)

FOREIGN PATENT DOCUMENTS

DE    195 23 795 C1    12/1996
DE    101 40 687 A1    3/2003
(Continued)

OTHER PUBLICATIONS

JPO, Japanese Office Action—Notice of Reasons for Refusal, for Japanese Patent Application No. JP 2022-549129, Sep. 14, 2023 (9 pp.) and English Translation (11pp.).
(Continued)

*Primary Examiner* — Marcus E Harcum
(74) *Attorney, Agent, or Firm* — Pauley Erickson & Swanson

(57)    ABSTRACT

A holding device and a method for mounting such a holding device on a cable having a braid situated externally at least in certain regions. The holding device includes a base element (4) with a base (9) for fastening the base element (4) to a housing, and a bracing element (5) for operative connection to the base element (4), and also a crimp element (6) with an outer crimp sleeve (10), and, arranged therein, an inner supporting sleeve (11). In a state in which the cable (2) is mounted in the holding device (1), the braid (3) is arranged between the crimp sleeve (10) and the supporting sleeve (11), and the shield braid (4) is crimped between the crimp sleeve (10) and the supporting sleeve (11).

13 Claims, 2 Drawing Sheets

(51) Int. Cl.
  *H01R 13/58* (2006.01)
  *H01R 13/6591* (2011.01)
  *H01R 43/048* (2006.01)
  *H02G 3/06* (2006.01)
  *H02G 3/22* (2006.01)

(52) U.S. Cl.
  CPC ... *H01R 13/5808* (2013.01); *H01R 13/65912* (2020.08); *H01R 43/048* (2013.01); *H02G 3/0658* (2013.01); *H02G 3/0666* (2013.01); *H02G 3/0675* (2013.01); *H02G 3/22* (2013.01)

(58) Field of Classification Search
  USPC .......................................................... 439/585
  See application file for complete search history.

(56) References Cited

U.S. PATENT DOCUMENTS

| | | | | |
|---|---|---|---|---|
| 6,089,913 | A * | 7/2000 | Holliday | B25B 27/10 |
| | | | | 439/462 |
| 6,231,357 | B1 * | 5/2001 | Rumsey | H01R 13/53 |
| | | | | 439/95 |
| 6,443,457 | B1 * | 9/2002 | Daoud | H02G 15/04 |
| | | | | 277/609 |
| 6,688,896 | B2 * | 2/2004 | Matsumoto | H02G 3/0666 |
| | | | | 439/98 |
| 7,018,220 | B2 | 3/2006 | Zemba | |
| 7,059,900 | B2 * | 6/2006 | Holliday | H01R 9/0518 |
| | | | | 439/585 |
| 7,669,316 | B2 * | 3/2010 | Johnsen | H01R 24/547 |
| | | | | 29/857 |
| 8,011,955 | B1 * | 9/2011 | Lu | H01R 9/0524 |
| | | | | 439/585 |
| 8,191,250 | B2 * | 6/2012 | Kawase | H01R 9/0509 |
| | | | | 174/75 C |
| 8,535,085 | B1 * | 9/2013 | Reilly | H01R 13/6592 |
| | | | | 439/462 |
| 8,602,797 | B2 * | 12/2013 | Omae | H01R 13/6592 |
| | | | | 439/99 |
| 9,093,782 | B2 * | 7/2015 | Wang | H01R 13/748 |
| 9,123,453 | B2 * | 9/2015 | Casanova | H01R 13/5845 |
| 9,472,901 | B2 * | 10/2016 | Wang | H01R 13/6593 |
| 9,640,965 | B1 * | 5/2017 | Long | H02G 15/007 |
| 9,692,146 | B2 * | 6/2017 | Justi | H01R 4/48 |
| 10,090,610 | B2 * | 10/2018 | Thomas | H01R 24/38 |
| 2005/0118871 | A1 | 6/2005 | Zemba | |
| 2010/0022125 | A1 | 1/2010 | Burris et al. | |
| 2010/0022126 | A1 * | 1/2010 | Miyashita | H01R 9/05 |
| | | | | 439/585 |
| 2012/0258622 | A1 | 10/2012 | Oh et al. | |
| 2013/0130545 | A1 * | 5/2013 | Wei | H01R 9/0524 |
| | | | | 439/585 |
| 2015/0008032 | A1 * | 1/2015 | Nakai | B60R 16/0222 |
| | | | | 174/650 |
| 2015/0237771 | A1 | 8/2015 | Natter et al. | |
| 2016/0134093 | A1 | 5/2016 | Albert et al. | |
| 2017/0125994 | A1 * | 5/2017 | Barrett | H01R 13/6592 |
| 2017/0201034 | A1 | 7/2017 | Hikosaka | |
| 2021/0159615 | A1 * | 5/2021 | Herrmann | H01R 4/20 |

FOREIGN PATENT DOCUMENTS

| | | |
|---|---|---|
| DE | 10 2013 201 531 A1 | 7/2014 |
| DE | 20 2013 006 413 U1 | 10/2014 |
| EP | 1 548 898 A1 | 6/2005 |
| JP | 2005-158640 A | 6/2005 |
| JP | 2017-126551 A | 7/2017 |
| WO | WO 2018/157962 A1 | 9/2018 |

OTHER PUBLICATIONS

EPO (Riswijk, NL), English language translation of the International Search Report, Form PCT/ISA/210, for International Application PCT/EP2021/054134, Apr. 26, 2021 (2 pages).
JPO, Japanese Office Action—Notice of Reasons for Refusal, for Japanese Patent Application No. JP 2022-549129, Feb. 15, 2024 (10 pp.) and English Translation (9 pp.).
KIPO, Korean Office Action-Notice of Grounds for Rejection, for Korean Patent Application No. 10-2022-7032454, Apr. 22, 2024 (5 pp.) and English Translation (5 pp.).
IPO, Indian Hearing Notice for Indian Patent Application No. 202247052947, Apr. 16, 2024, with English translation (2pp.).

* cited by examiner

HOLDING DEVICE FOR A CABLE

CROSS REFERENCE TO RELATED APPLICATION

This application is a National Phase filing in the United States, under 35 USC § 371, of PCT International Patent Application PCT/EP2021/054134, filed on 19 Feb. 2021 which claims the priority of Swiss Patent Application CH 00195/20, filed 20 Feb. 2020.

These applications are hereby incorporated by reference herein in their entirety and is made a part hereof, including but not limited to those portions which specifically appear hereinafter.

BACKGROUND OF THE INVENTION

Field of the Invention

The present invention relates to a holding device for holding a cable having a braid, in particular a shielded braid.

Discussion of Related Art

Holding devices of this type can serve as a tension relief for the cable, on the one hand, as well as for electromagnetically shielding and for dissipating interference in the line. To this end, the cable is axially secured and electrical contact is established with the cable braid which is arranged below an outer cable sheath (insulation). Various holding devices are known from the prior art. Current holding devices typically comprise a sleeve-shaped base element which is arranged over a cable, a clamping element which fixes the cable, and a tensioning element which can be connected to the base element and positions the clamping element on the base element. Depending on the application, a contact element for electrically contacting the cable braid can likewise be present.

An example is DE19523795 which shows a cable ducting for a shielded switching cable. The cable ducting comprises a grounded clamping sleeve, which encompasses an exposed shielding sheath and jams the latter so as to provide contact. The cable ducting additionally has a crush sleeve, which is divided into a thin-walled crushing portion and a thick-walled support portion. The crush sleeve by way of the crushing portion thereof is pushed over the end portion of the switching cable that has not been stripped, and is crushed conjointly with said end portion by crimping. The exposed shielding sheath is furthermore folded back over the support portion, and the clamping sleeve by way of a clamping portion is pushed over the support portion with the shielding sheath and is likewise conjointly crushed with the latter by (radial) crimping.

DE102013201531 shows an electrically contacting connection between a shield of a shielded line and a housing wall. The line is surrounded by a contact sleeve which electrically contacts the shield and the housing wall. The contact sleeve is crimped onto an external sheath of the line.

Inadequate electrical contacting often arises in the known holding devices for cables having a shielded braid. This leads to, inter alia, a poor quality of the shield having, inter alia, high shielding losses. Inadequate electrical contacting can arise, for example, when the braid has been excessively or else insufficiently compressed. For a good quality of the shield it is therefore necessary not only to use a line with maximum shielding, but also to use holding devices which have good electromagnetic compatibility. It has to be ensured that the contacting mechanism of the shield, apart from meeting the electrical requirements, is likewise of a mechanically stable design.

SUMMARY OF THE INVENTION

It is an object of the disclosure to provide a holding device having an improved connection of a cable braid.

A holding device according to the disclosure is intended for a cable having an at least partially external braid. The cable can comprise at least one conductor and a cable sheath that protects the braid. However, the cable sheath is preferably partially removed in an assembly region of the cable, where the holding device is to be attached, such that the braid is arranged on the outside. Depending on the embodiment, the cable may be a shielded cable. The braid can be a shielded braid of the cable. Alternatively, or additionally, the braid can be used for grounding. Apart from the braid, and depending on the embodiment, the cable can have a film/foil, in particular a shielding foil/film (for example a metal foil and/or a metallized plastic film, or similar) above or below the braid.

The holding device according to the disclosure comprises a base element, a tensioning element interconnected to the base element, and a crimp element. The crimp element serves in particular for fixing and contacting the braid on the crimp element by crimping. Axial crimping is particularly advantageous. The fixing of the cable, or of the braid, respectively, on the crimp element is preferably non-releasable such that a reliable and durable connection is achieved. When the braid is utilized as a shield, such a connection ensures a long-lasting, high-quality electrical contact. The axial crimping ensures a symmetrical compression with a uniform distribution of force on the braid. This results in a generally less aggressive connection having lower shielding losses. Moreover, as opposed to radial compression, the effect of arising tolerances, such as caused by a braid that has not been uniformly flared, for example, is reduced in the case of axial compression. Apart from the effects on the contacting of the shield, the axial crimping however likewise has a positive effect on the insulation properties of the cable because negative stresses such as, for example, a constriction of the cable insulation can be minimized.

A first opening for the passage of the cable extends in an axial direction through the base element. Furthermore, the base element advantageously comprises a base for bearing and mounting the base element on a housing. A bearing face of the base is advantageously configured in such a manner that said bearing face bears on the housing at least in regions. The base element can be manufactured from an electrically conducting material and/or have an electrically conducting coating. In one potential embodiment, the base element has first operative connection means so as to operatively connect said base element to a housing, for example. The holding device can have a thread as the first operative connection means. However, further operative connection types are also conceivable. Furthermore, the base element can have a further (second) operative connection means such as, for example, a thread so as to be interconnected to the tensioning element.

The tensioning element has a second opening for the passage of the cable extending in the axial direction. Said opening is advantageously arranged so as to be coaxial with the first opening. In one potential embodiment, the tensioning element has third operative connection means so as to operatively connect said tensioning element to the second operative connection means of the base element. In one potential embodiment, the tensioning element is a clamping nut that can be screwed to the base element. The tensioning element can serve for fixing the crimp element arranged between the base element and the tensioning element, and optionally fixing a clamping element, as is described in more detail hereunder.

The clamping element can serve for additionally holding and clamping the cable in the holding device. Depending on the application, the clamping element can also serve for sealing the cable in relation to the holding device. In an assembled state, the clamping element in the axial direction can be arranged between the base element and the tensioning element. The clamping element can be designed in one or more parts. Depending on the embodiment, the clamping element can have, for example, at least one slot, in particular in the axial direction. The slot can be designed wave-shaped. A wave-shaped slot has the advantage that the clamping element for laterally incorporating the cable can be opened (or flared, respectively), but the clamping element in the assembled state cannot break loose. The clamping element is advantageously made from a deformable material, in particular a ductile material. The clamping element is advantageously designed so as to be in particular radially deformable and/or radially resilient. This may be caused either by properties of the material and/or be achieved by the shaping of the clamping element; in this way the clamping element can e.g., have at least one slot. The at least one slot can be oriented in the radial or in the axial direction. Likewise, the at least one slot can be designed so as to be continuous in the radial and/or in the axial direction such that an annular clamping element is e.g., imparted a C-shape. When a clamping element is present, the crimp element serves in particular for electrically contacting the braid, while the clamping element serves for holding the cable, for absorbing tensile forces, and for optionally sealing the cable in relation to the holding device. In this way, the braid is not excessively stressed and the electrical contacting of the cable is at a separate location from the fixing of the cable.

In one preferred embodiment the holding device can have an anti-twist device. The latter can serve for preventing a rotation of the base element in relation to the clamping element. To this end, the anti-twist device can comprise at least one first retaining element arranged on the clamping element, and at least one second retaining element arranged on the base element. In an assembled state, the retaining elements engage in one another at least in regions, positioning the clamping element in the base element in a circumferential direction. The at least one first retaining element can be arranged on an outer shell face of the clamping element. The outer shell face points away (towards the outside) from an opening which f extends in the axial direction or the passage of the cable through the clamping element. The at least one second retaining element can furthermore be arranged on an inner shell face of the base element. The inner shell face of the base element points in the direction of the first opening for the passage of the cable. The at least one first retaining element can be embodied in the form of a recess, while the at least one second retaining element can be a shaped element which in the assembled state engages in the recess at least in regions (or vice-versa). A plurality of (first and second) retaining elements are advantageously arranged so as to encircle the respective shell face, in particular so as to be at a uniform mutual spacing. For example, the anti-twist device, or the first and/or second retaining elements, respectively, can be embodied as a toothing and/or knurling. A knurling can represent a stamped or milled feature in the respective shell face. A knurling is typically produced by a knurling process.

The crimp element in the assembled state can be arranged between the base element and the tensioning element, or the base element and the clamping element, respectively. By tightening the tensioning element, the clamping element can be tensioned and positioned in relation to the crimp element and the latter in relation to the base element. The crimp element is advantageously in multiple parts, in particular two parts. For example, the crimp element can comprise an outer crimp sleeve and an inner support sleeve arranged therein. In an assembled state of the cable in the holding device, the (exposed) braid is arranged between the crimp sleeve and the support sleeve. The crimp sleeve can be crimped to the inner support sleeve, in particular axially crimped thereto, in such a manner that the braid is fixed between the crimp sleeve and the support sleeve.

For crimping, the crimp sleeve preferably can have a crimping region. The latter can extend in the axial direction. Regarding a good deformation capability, the crimping region is advantageously designed so as to be thin-walled. The crimping region can project from a base of the crimp sleeve that has a thicker wall. The crimp sleeve can have a receiving space for receiving the support sleeve. For positioning the support sleeve in the crimp sleeve, the crimp sleeve, on an internal side, in the axial direction can alternatively or additionally comprise a stop for the support sleeve. In this way, the crimp sleeve can be pushed in the axial direction onto the support sleeve from one side until the support sleeve has made its way into the receiving space and rests on the stop. In an assembled state of the support sleeve in the crimp sleeve, or in the receiving space, respectively, and in an (as yet) non-deformed state of the crimping region, the crimping region in the axial direction advantageously projects beyond the support sleeve. In this way, the crimp sleeve, in a deformed state upon crimping, covers the support sleeve in relation to the cable. After crimping, the deformed crimping region advantageously lies snugly in regions on the cable (next to the support sleeve). The latter has the advantage that the cable is better supported in particular under bending loads and predetermined breaking points can be reduced. Positive contacting of the braid is achieved when a length C in the axial direction, measured from a folding edge where the braid (for the first time) is folded about the support sleeve to a distal end of the (non-deformed) crimping region, has a ratio of C/D=0.3-0.5, in particular C/D=0.4-0.45, in relation to an outer diameter D of a contact surface of the crimp sleeve. The contact surface serves for applying an axial contact pressure force so as to axially crimp the crimp sleeve and the support sleeve. The contact surface is advantageously arranged on the base of the crimp sleeve, in particular on the distal end of the crimp sleeve that in the axial direction faces away from the support sleeve. The diameter D can correspond to the smallest diameter of the first opening of the base element. Such a ratio results in an optimum compression for positively electrically contacting the braid with minor shielding losses. Depending on the application, the crimp sleeve moreover can have at least one through opening extending in the radial direction. The latter enables a technician to visually identify the braid through said through opening in the assembled state. The crimp sleeve on the external side thereof advantageously has an encircling protrusion (at least in regions). Said protrusion, in the assembled state, can serve for the crimp element in the axial direction to rest on a shoulder in the base element or in the tensioning element, on the one hand. On the other hand, in the case of axial crimping, this protrusion can likewise serve as a stop in a crimping tool for axial crimping or similar. To this end, a side of the protrusion facing the crimping region may be beveled such that a crimping face for the crimping tool that is angled in relation to the axial direction is formed. The crimp sleeve is advantageously electrically conducting, in particular metallic. For example, the crimp sleeve can comprise copper, brass or other readily deformable and conductive materials.

The support sleeve typically rests substantially on the cable sheath. For rapid and simple assembling, the support sleeve can have a radially inward projecting shoulder for resting on an end of the cable sheath. In one potential embodiment, the support sleeve is L-shaped in the cross section, for example. In this way, the support sleeve can be pushed onto the cable in the axial direction from one side until the shoulder impacts the cable sheath. After the positioning of the support sleeve, the braid can be flared and be folded about said support sleeve, or inverted onto the latter, respectively (at least in regions). Subsequently, the crimp sleeve is pushed onto the support sleeve having the flared braid folded thereon such that said braid is arranged between the support sleeve and the crimp sleeve. In this way, the braid, in an assembled state of the crimp sleeve on the support sleeve, can be arranged between a first contact face of the crimp sleeve and a second contact face of the support sleeve. The first and/or the second contact face, at least in regions (in a first region), can advantageously point in the radial direction (normal to the cable) or be designed so as to be conical, in particular conical in the axial direction. The alignment of this (first) region is particularly advantageous in the case of an axial compression because the contact pressure force is at the maximum in this region, on the one hand, and can be adjusted and/or measured in a particularly precise manner, on the other hand. Between 20% to 40% of the exposed braid is advantageously arranged in this (first) region, or 20% to 40% of the contact face is advantageously aligned in the radial direction, respectively. The first region of the first contact face of the crimp sleeve can moreover transition to a second region which, substantially in the axial direction, runs along an internal side of the crimp sleeve. Meanwhile, the first region of the second contact face of the support sleeve can transition to a second region which, substantially in the axial direction, runs along an external side of the support sleeve. However, contact faces that are conical at least in regions are also possible, as described above. One of the advantages of the conical embodiment, in particular in the first region, lies in that the angled contact faces enlarge the contacting face, thus enabling an improved dissipation of the currents in the braid.

The different regions of the respective contact faces advantageously transition into one another by way of rounded regions, such that damage to the braid is reduced. This is particularly advantageous in the case of the second contact face that is arranged on the support sleeve. With regard to a good electrical contact, the first and/or the second contact face can be provided with an electrically conductive coating. However, the support sleeve is advantageously electrically conductive, in particular metallic, at least partially. For example, the support sleeve can be at least partially comprised of copper or brass. The use of the same material for the crimp sleeve and the support sleeve is advantageous to the extent that the respective temperature dependency of the components to be crimped is similar.

For axial crimping of the crimp element it is advantageous for the support sleeve to be designed so as to be axially deformable. To this end, the support sleeve can have at least one deformation region for the axial deformation. The deformation region, in the assembled state of the support sleeve in the crimp sleeve, is advantageously arranged on an end that faces away from the base of the crimp sleeve. It is moreover particularly advantageous for the deformation region, in the assembled state of the support sleeve in the crimp sleeve and prior to crimping, in the radial direction to be at least in regions arranged between the cable and the crimping region of the crimp sleeve. The deformation region can be arranged on an internal side of the support sleeve, for example. The deformation region can have at least one strain relief groove and/or at least one strain relief groove. By means of these grooves, the support sleeve can be better axially stretched or compressed, respectively. The grooves can in each case run about one feeding opening of the support sleeve.

For a good path of the electric line from the braid of the cable into the housing to which the holding device is interconnected, for example, a contact spring for electrical contacting of the crimp element can be arranged between the base element and the crimp element (or alternatively between the tensioning element and the crimp element). The contact spring is advantageously radially deformable. In the assembled state, the contact spring advantageously exerts radial contact pressure force on the crimp element. The contact spring is advantageously annular or C-shaped in the axial direction. A laminated spring or a lamellar spring can be used, for example. The contact spring can be arranged in a radial groove of the base element and/or of the crimp sleeve. The radial groove of the base element advantageously encircles the first opening. Depending on the embodiment however, variants in which the groove is arranged in the tensioning element are also conceivable. Depending on the embodiment, the groove can be dovetail-shaped in the cross section.

For assembling the holding device, the braid of the cable at the cable end to be fastened can first be exposed. Furthermore, the holding device can subsequently be prepared in that the individual components are already threaded onto the exposed cable in the sequence of installation. To this end, the tensioning element is first pushed onto the cable, followed by the support sleeve. The support sleeve by way of the radial shoulder can be pushed up to an end of the cable sheath and positioned there. Subsequently, the braid of the cable is flared and said braid is placed about the support sleeve. Braid projecting beyond the support sleeve can be severed. Alternatively, the braid can also be correctly sized prior to the components being applied. Thereafter, the crimp sleeve is pushed onto the cable and onto the support sleeve. The crimp sleeve and the support sleeve are then crimped, in particular axially crimped, such that the braid is advantageously non-releasably fixed there-between. For axial crimping, the cable is placed with the crimp element in an assembly tool and crimped therein, while applying a force in the axial direction. After this step, the base element is pushed onto the cable. The base element advantageously has a stop for the crimp element. The base element can be interconnected to the tensioning element. If a clamping element is present, the latter is pushed onto the cable prior to the support sleeve being pushed on. Alternatively, when the clamping element has a corresponding slot, said clamping element can also be laterally clipped onto the cable thereafter. In the assembled state, the crimp element is then arranged between the tensioning element and the base element or, if present, between the clamping element and the base element, respectively. When the cable has a foil/film, in particular a shielding foil/film, below the braid, this foil/film can be removed in regions. Alternatively, this foil/film can be guided further along the cable without being inverted. When the foil/film is arranged above the braid, a removal is however particularly expedient because the foil/film impedes the folding back of the braid.

During compressing, the tool can moreover leave on an embossing. The embossing can be arranged on an outer side of the crimp sleeve, for example on the crimping region and/or on the crimping face. The embossing can display an item of information pertaining to the used crimping parameters such as, for example, tool parameters, number of compressions, pressing force, manufacturer logo, etc. Additionally, the embossing can represent a quality feature for the user.

BRIEF DESCRIPTION OF SEVERAL VIEWS OF THE DRAWINGS

Aspects of the disclosure will be explained in more detail by means of the exemplary embodiments shown in the figures and the associated description.

DETAILED DESCRIPTION OF THE INVENTION

Figure 1:
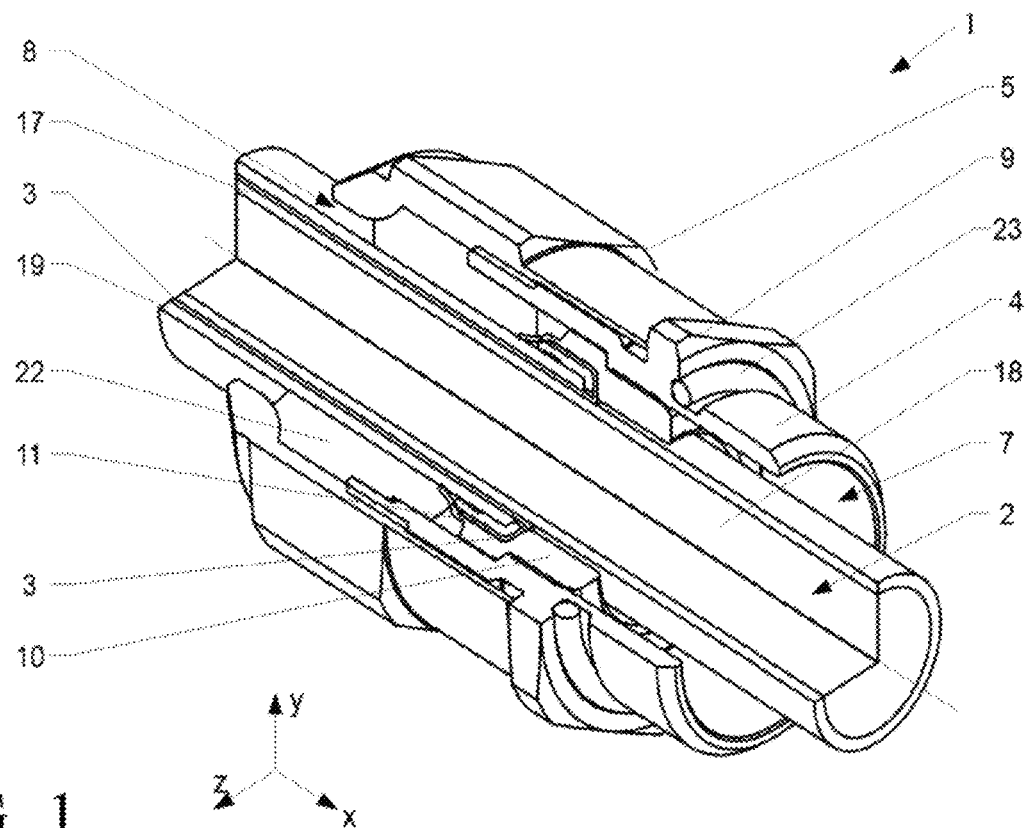
FIG. 1 shows a variant of a holding device according to the disclosure in a perspective, partially sectional view.
Figure 2:
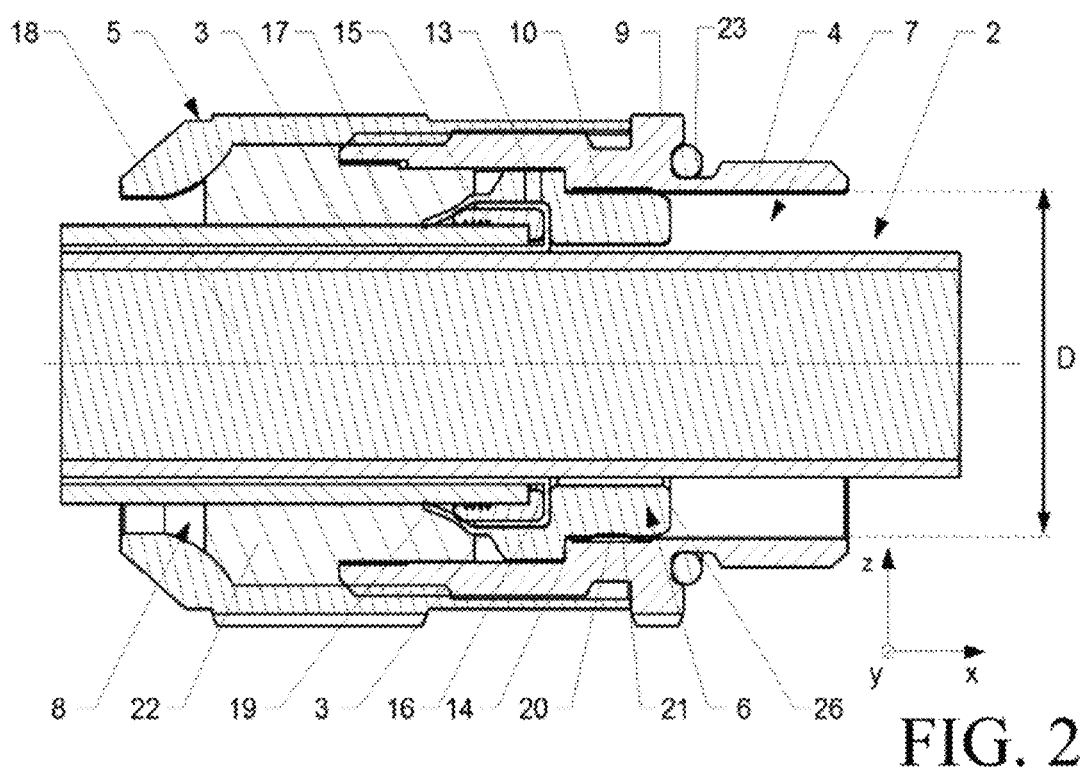
FIG. 2 shows the variant of the holding device according to FIG. 1 in a sectional lateral view.

FIG. 1 to FIG. 2 show a variant of a holding device 1 according to the disclosure in an assembled state on a cable 2. The cable 2 comprises a conductor 18 having a braid 3 surrounding the latter, in particular a shielded braid. An intermediate insulation 17 is arranged between the braid 3 and the conductor 18. The braid 3 is surrounded from the outside by a cable sheath 19. Other types of cables and constructions are however likewise possible. The cable sheath 19 is removed in the region of the holding device 1, and an end of the braid 3 is exposed.

The holding device 1 comprises a base element 4 and a tensioning element 5 which can be interconnected to the latter. The base element 4 serves for mounting the holding device 1 e.g. at a housing, or similar (not shown). Therefore, said base element 4 has a base 9 having a bearing face for bearing on the housing. A seal 23 for sealing the holding device 1 in relation to the housing can be arranged on the base 9. In the case shown, the tensioning element 5 is a clamping nut, but other embodiments of the tensioning element are also conceivable. The base element 4 has a first opening 7 which extends in an axial direction for the passage of the cable 2, while the tensioning element 5 has a second opening 8 which extends in the axial direction for the passage of the cable 2. The tensioning element 5 serves, inter alia, for clamping a clamping element 22, arranged between the base element 4 and the tensioning element 5, and for holding the cable 2 and optionally sealing the latter. The clamping element 22 is advantageously made from a deformable material. Moreover, a crimp element 6 is arranged between the base element 4 and the tensioning element 5. The crimp element 6 in the axial direction is arranged between the clamping element 22 and the base element 4. Moreover, a contact spring 20 is arranged in the radial direction in the base element 4, said contact spring 20 being arranged in a groove 21 that radially encircles the first opening 7. The contact spring 20 ensures improved electrical contact between the crimp element 6 and the base element 4.

Figure 3:
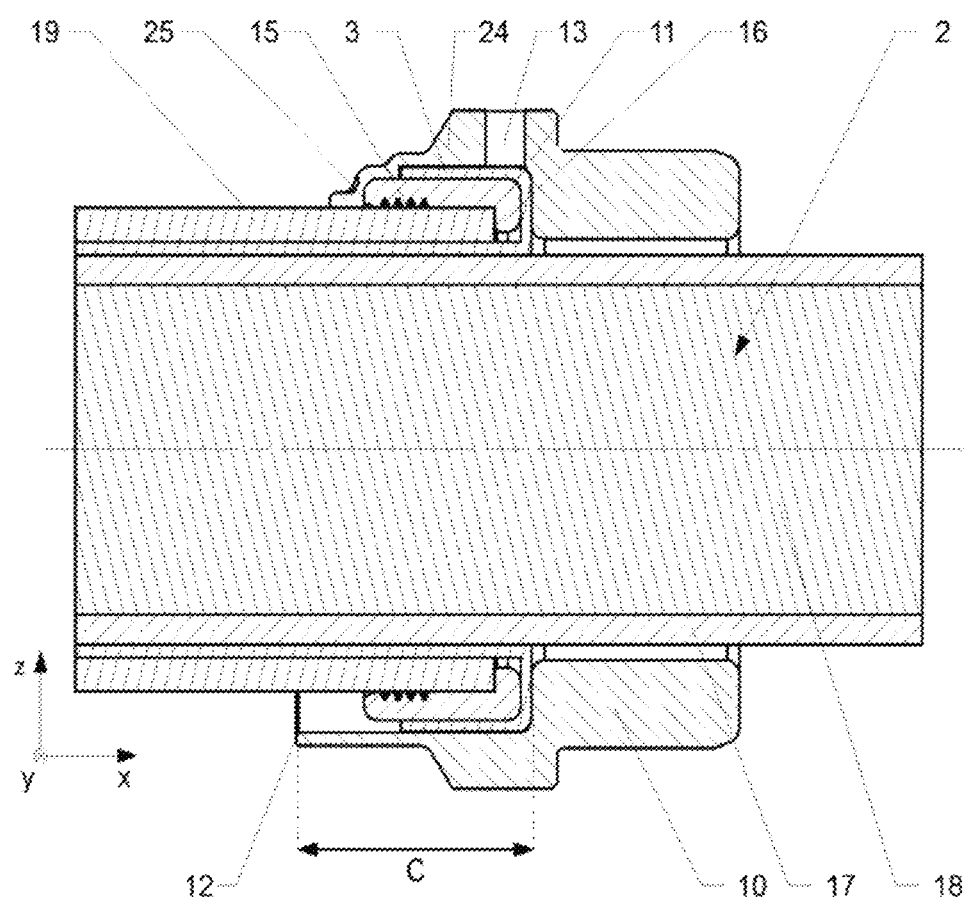
FIG. 3 shows a cable having a crimp element.

The crimp element 6 comprises an outer crimp sleeve 10 and an inner support sleeve 11 which is arranged in the latter and is advantageously axially deformable. The cable 2 having the crimp element 6 is shown in FIG. 3. In the lower part of the image, the non-deformed crimp sleeve 10 is shown (prior to crimping). In the upper part of the figure, the deformed crimp sleeve 10 is shown (after crimping). In both states, the braid 3 is arranged between the crimp sleeve 10 and the support sleeve 11. After crimping, the crimp element 6 is advantageously fixedly connected to the cable 2. The deformed crimping region 12 can fit snugly about the support sleeve 11 and in regions about the cable 2. An embossing 25 as a result of crimping, or of the crimping tool, respectively, can be arranged on an outer side of the crimp sleeve 10, for example on the crimping region 12. Prior to crimping, the deformable crimping region 12 extends in the axial direction. The crimping region 12, in the assembled state of the support sleeve 11 in the crimp sleeve 10, in the axial direction then projects beyond said support sleeve 11 (cf. lower part of the figure). In the variant shown, a length C, defined from the end of the (non-deformed) crimping region 12 in the axial direction up to a folding edge of the braid, has a ratio of C/D=0.3-0.5 in relation to an outer diameter D of a contact surface 26 of the crimp sleeve 10 (see FIG. 2). The contact surface 26 serves for applying the axial contact pressure force about the crimp sleeve 10 and the support sleeve 11 for crimping. For crimping, the crimp sleeve 10 on the outer side has an encircling protrusion 24. The latter, in the assembled state, in the axial direction bears on the stop 14 of the base element 4.

It is furthermore possible that the support sleeve 11 has at least one deformation region 15 for the axial deformation. In the case shown, the support sleeve 11 on its internal side that faces the cable 2 has a plurality of grooves, which in the case of an axial deformation can serve as strain relief grooves and/or crushing grooves. It can be seen, in the deformed state as well as the non-deformed state, that the support sleeve 11 has a radial shoulder 16 for resting on an end of the cable sheath 19. Furthermore, the crimp sleeve 10 in the axial direction comprises a stop 14 for the support sleeve 11. In this way, the support sleeve 11, and by way of the latter the crimp sleeve 10, can be easily and rapidly positioned on the cable 2. It is furthermore advantageous for the crimp sleeve 10 to have at least one radial through opening 13 such that the intervening braid 3 can be visually identified in the assembled state through said through opening 13. In the deformed state, the support sleeve 11 is enclosed and held by the crimp sleeve 10 and the cable 2.

In order for the holding device 1 shown to be assembled, the braid of the cable 2 below the cable sheath 19 can first be exposed. The tensioning element 5 can then be threaded onto the cable 2, followed by the clamping element 22 and the support sleeve 11. The support sleeve 11 by way of the radial shoulder 16 can be pushed up to an end of the cable sheath 19 and positioned there. The braid 3 of the cable 2 is subsequently flared and is placed about the support sleeve 11. Any projecting braid 3 can be severed. Thereafter, the crimp sleeve 10 is pushed onto the cable 2 and over the support sleeve 11. The braid 3 can then be axially crimped between the crimp sleeve 10 and the support sleeve 11. After this step, the base element 4 is pushed onto the cable 2 and interconnected to the tensioning element 5.

The invention claimed is:

1. A holding device (1) for a cable (2) having an at least partially external braid (3), comprising:
   a. a base element (4) having:
      i. a first opening (7) which extends in an axial direction for passage of the cable (2);
      ii. a base (9) for mounting the base element (4) on a housing;
   b. a tensioning element (5) for interconnection to the base element (4), having a second opening (8) which extends in the axial direction for the passage of the cable (2);
   c. a crimp element (6) having:
      i. an outer crimp sleeve (10) and a therein arranged inner support sleeve (11),
      ii. wherein, in an assembled state of the cable (2) in the holding device (1), the braid (3) is arranged between the crimp sleeve (10) and the support sleeve (11), and the crimp sleeve (10) and the support sleeve (11) are crimped to one another, and
      iii. a contact spring (20) for electrically contacting the crimp element (6) arranged in a radial groove (21) of the base element (4) and/or of the crimp sleeve (10).

2. The holding device (1) according to claim 1, wherein the crimp sleeve (10) and the support sleeve (11) are crimped axially.

3. The holding device (1) according to claim 1, wherein the crimp sleeve (10), in a non-deformed state prior to crimping, comprises a crimping region (12) extending in the axial direction.

4. The holding device (1) according to claim 3, wherein, prior to crimping and in the assembled state of the support sleeve (11) in the crimp sleeve (10), the crimping region (12) projects beyond the support sleeve (11) in the axial direction.

5. The holding device (1) according to claim 3, wherein a length C, measured in the axial direction from a folding edge of the braid (3) to a distal end of the crimping region (12), has a ratio of C/D=0.3-0.5 in relation to an outer diameter D of a contact surface (26) of the crimp sleeve (10).

6. The holding device (1) according to claim 1, wherein the crimp sleeve (10) has at least one radial through opening (13) such that in the assembled state the braid (3) can be optically recognizable through said through opening (13).

7. The holding device (1) according to claim 1, wherein the crimp sleeve (10) in the axial direction comprises a stop (14) for the support sleeve (11).

8. The holding device (1) according to claim 1, wherein the crimp sleeve (10) is axially deformable.

9. The holding device (1) according to claim 1, wherein the support sleeve (11) has at least one deformation region (15) for the axial deformation.

10. The holding device (1) according to claim 1, wherein the support sleeve (11) has a radial shoulder (17) for resting on an end of the cable sheath (19).

11. A method for assembling the holding device (1) according to claim 1, comprising the following method steps:
   a. providing the holding device (1);
   b. providing the cable (2) having the at least partially external braid (3);
   c. pushing the tensioning element (5) onto the cable (2);
   d. pushing the support sleeve (11) onto the cable (2);
   e. flaring and folding the braid (3) about the support sleeve (11);
   f. pushing the crimp sleeve (10) onto the cable (2) and about the support sleeve (11);
   g. crimping the crimp sleeve (10) and the support sleeve (11);
   h. pushing the base element (4) onto the cable (2); and
   i. interconnecting the tensioning element (5) that has been pushed onto the cable (2) to the base element (4).

12. The method for assembling according to claim 11, wherein, prior to pushing on the support sleeve (11), at least one clamping element (22) is first pushed onto the cable (2).

13. The method for assembling according to claim 11, wherein the crimp sleeve (10) and the support sleeve (11) are crimped axially.

* * * * *